D. C. ROBERTS.
PNEUMATIC TIRE.
APPLICATION FILED JAN. 17, 1916.
1,186,437.
Patented June 6, 1916.
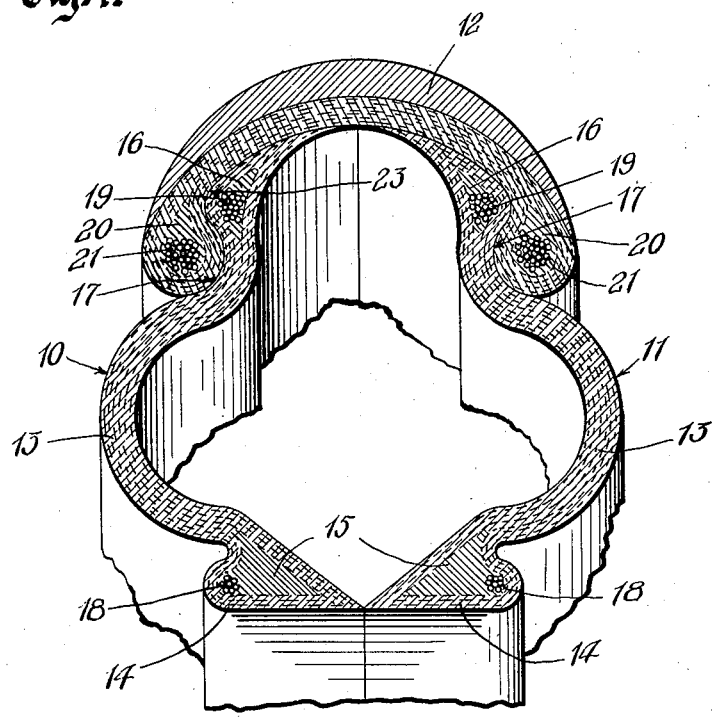
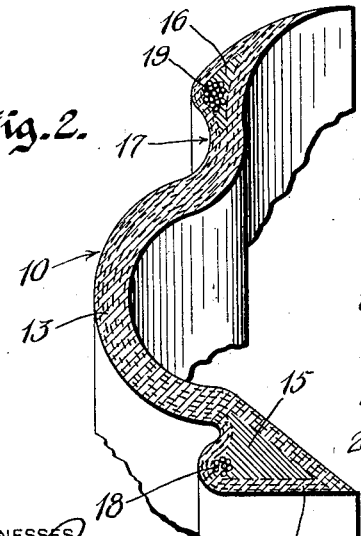
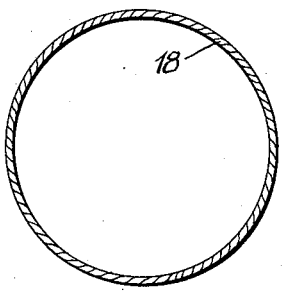
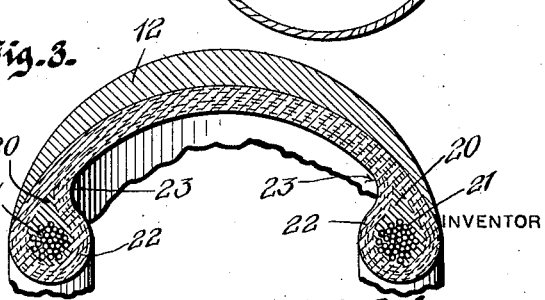
WITNESSES
INVENTOR
Daniel C. Roberts
BY
ATTORNEY

UNITED STATES PATENT OFFICE.

DANIEL C. ROBERTS, OF TRENTON, NEW JERSEY.

PNEUMATIC TIRE.

1,186,437.

Specification of Letters Patent.

Patented June 6, 1916.

Application filed January 17, 1916. Serial No. 72,569.

*To all whom it may concern:*

Be it known that I, DANIEL C. ROBERTS, a citizen of the United States, residing at Trenton, in the county of Mercer and State of New Jersey, have invented certain new and useful Improvements in Pneumatic Tires, of which the following is a specification.

My present invention has relation to certain new and useful improvements in pneumatic tires, and as its primary object it contemplates the provision of a novel device of this nature wherein the tread portion is made detachable with respect to the remaining structure thereby providing for the quick and easy removal and replacement of the said portion, either for substitution or repair.

Another object of my invention is to provide an improved tire of the nature aforesaid that is constructed whereby it is readily applicable to conventional forms of clenching devices and rims.

A further object of my invention is to provide a device of the type in question that is extremely simple in construction, strong and durable, and highly practical from both the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claim.

Figure 1 is a view in cross section of the tire showing more clearly the method of arranging the tread portions in place; Fig. 2 is a cross sectional view of one of the side elements; Fig. 3 is a view in cross section of the tread portion; Fig. 4 is a view in detail of an improved reinforcing member that is associated with the device, as will subsequently appear.

In reducing my invention to practice, I first provide complemental side portions, designated by the numerals 10 and 11 respectively, in connection with which is associated a detachable tread member which likewise is designated in its entirety by the numeral 12. The inner tube (not shown) being inflated will force the side members 10 and 11 outwardly so as to securely bind with the adjacent portion of the tread member thereby forming an efficient tire shoe. However, should the tread become worn to an extent where substitution is necessary or it should be desired to remove the same for repair, upon the deflation of the inner tube the tread member may be readily removed. By the provision of this novel form of tread member wear upon the side portion is materially decreased and the longevity of the tire shoe, as a whole, greatly increased.

In the present embodiment, I have shown the respective side members 10 and 11 substantially complemental, the same being preferably constructed of laminated sheets of reinforcing fabric and rubber. The side members consist generally of a body portion 13 formed as aforesaid, the inner edge thereof being formed into an annular shoe 14, such as by interposing an insert 15 of rubber or a like material between the several layers of material, while adjacent its upper end, it is provided with a second insert 16 of rubber or other elastic material, the latter incidentally providing an annular receiving groove 17. At its outer edge, the side portions are tapered as shown in Fig. 1, in order to lie in snug engagement with the tread member and provide a comparatively tight connection therewith.

In order to provide for the partial rigidity of the side members, reinforcing agents, such as indicated by the numerals 18 and 19 respectively, may be passed through the insert members 15 and 16 in the manner clearly shown in Fig. 2, the said reinforcing agents being shown in their preferred embodiment in Fig. 4.

The reinforcing members are preferably circular in form so as to extend about the entire side portions thereby reinforcing the same at the shoes 14, which in the use of the tire are engaged by the clencher rim of the wheel and at a point adjacent the outer edge of the shoe to more efficiently co-act with the tread member, such as will subsequently appear.

The tread member, designated in its entirety by the numeral 12 in Figs. 1 and 3, is preferably constructed of series of laminated sheets of reinforcing fabric and rubber, the said sheets having inserts 20 and 21 respectively interposed therebetween, adjacent the longitudinal edges of the tread to provide offset portions for seating engagement in the grooves 17 of the side members when the tire is in use. Reinforcing agents, such as shown in detail in Fig. 4 and designated by the numeral 22 may be passed through the inserts 20 and 21 thereby adding greater rigidity to the respective offset portions of the tread.

By providing the respective longitudinal edges of the tread with offsets, such as aforesaid for seating engagement in the grooves 17 of the side members, grooves or recessed portions 23 are also formed in the tread, adjacent the said offset portions for accommodating the enlarged portions of the side members, adjacent the inserts 16. Consequently when in the position shown in Fig. 1, the tread member will be held in interlocking engagement with the respective side portions.

When under pressure of the inserted inner tubes, the upper end portion of the side members 10 and 11 will have a tendency to move from each other whereby they will be forced into engagement with the inner face of the tread portion. The offsets of the side members securely bind in the recesses 23 of the tread while the offsets of the tread enter the grooves 17 of the side members, thus the greater the pressure applied by the inner tube the more secure connection will be formed, between the side members and the tread. The introduction of reinforcing agents in the side portions and the tread provides each of the elements with co-acting ribs, as they may be termed thereby forming a more secure connection and obviating the liability of the displacement of the side portions with respect to the tread during operation of the tire.

When desiring to remove the tread the inner tube is simply deflected to a certain extent in order to permit the forcing of the upper end of the side members inwardly. If worn to a great extent a new tread may be introduced in connection with the side members, at approximately half the cost of an ordinary tire, whereas in the event that the old tread is to be repaired, its detachment or connection with the side members does not necessitate the removal of the latter from the clencher rim. Furthermore, it will be understood that by reason of the introduction of the detachable tread, excessive wear upon the side members is eliminated and the longevity of the tire, as a whole, is in this manner greatly increased. Then to, by the introduction of the reinforcing agents in the side portions and the tread, greater protection is had against punctures of the inner tube or the usual blow outs.

In Fig. 4, I have shown the reinforcing agent which is used, in detail. In the present embodiment, the same consists of an annular body built up by interwinding a single strand of wire. A cable produced in this manner presents a highly durable reinforcing agent, and one that may be securely embedded in the rubber inserts.

The shoe portions of the side members may be made of varying configurations in order to be applicable in connection with various types of clencher structures and it is to be understood that I am not limited to that specific form shown in the drawings.

From the foregoing, it is believed that the advantages and novel features of the invention will be readily understood and, therefore, further detail description is deemed unnecessary.

In reducing my invention to practice, I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claim.

Having thus fully described my invention, what I claim as new and desire to secure by Letters Patent is:—

In a tire, two complemental tire sections, each being laterally curved, whereby when associated with the rim structure of the wheel they form an inner main inner-tube-receiving opening, and an outer orifice of less diameter extending circumferentially of the main opening, said orifice appearing slightly greater than a semi-sphere when viewed in cross-section, annular ribs on said tire sections in spaced relation to their outer longitudinal edges, and said sections having annular grooves immediately adjacent the inner side of said ribs in axial alinement with the side walls of said orifice; in combination with a tread member arcuately curved when viewed in cross section, annular ribs on said tread member at its longitudinal edges fitting the grooves of said sections, and said tread having grooves adjacent said last mentioned ribs to receive the ribs of said tire sections; whereby upon the introduction of air pressure between said tire sections and an axial pressure will be directed upon the rib and groove connection of said tread member with said sections, substantially as described.

In testimony whereof I affix my signature in presence of two witnesses.

DANIEL C. ROBERTS.

Witnesses:
M. A. O'CONNOR,
M. E. JONES.

Copies of this patent may be obtained for five cents each, by addressing the "Commissioner of Patents, Washington, D. C."